(12) United States Patent
Kelley

(10) Patent No.: US 6,422,170 B1
(45) Date of Patent: Jul. 23, 2002

(54) HYDROFOIL ANGULAR ALIGNMENT TOOL

(75) Inventor: Paul J. Kelley, Panama City Beach, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/923,259

(22) Filed: Aug. 6, 2001

(51) Int. Cl.[7] .................................................. G01B 3/30
(52) U.S. Cl. ......................................... 114/382; 33/567
(58) Field of Search .................................. 114/274, 280, 114/382; 29/271, 281.5, 464; 33/421, 471, 482, 520, 530, 534, 536, 537, 538, 567, 568

(56) References Cited

U.S. PATENT DOCUMENTS

| | | | | |
|---|---|---|---|---|
| 1,179,551 A | * | 4/1916 | Muller | 33/536 |
| 1,776,316 A | * | 9/1930 | Horeth | 244/48 |
| 2,105,054 A | * | 1/1938 | Posthuma | 33/567 X |
| 2,134,062 A | * | 10/1938 | Trbojevich | 33/567 |
| 3,331,134 A | * | 7/1967 | Jackson et al. | 33/534 X |
| 4,284,027 A | * | 8/1981 | Montez | 114/273 |
| 4,597,742 A | * | 7/1986 | Finkl | 114/284 X |

* cited by examiner

*Primary Examiner*—S. Joseph Morano
*Assistant Examiner*—Andy Wright
(74) *Attorney, Agent, or Firm*—Harvey A. Gilbert; Donald G. Peck

(57) ABSTRACT

A tool is provided for facilitating angular alignment of a hydrofoil coupled to a mounting block having a flat bottom surface area. The mounting block is pivotally coupled to a cylindrical strut having a longitudinal axis. The tool has a saddle for engaging the cylindrical strut and a plate coupled to the saddle. The plate has an alignment edge that, when positioned by the saddle beneath the flat bottom surface area of the mounting block, forms a desired angle with respect to the longitudinal axis of the cylindrical strut.

22 Claims, 1 Drawing Sheet

HYDROFOIL ANGULAR ALIGNMENT TOOL

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to alignment tools, and more particularly to a tool that facilitates the angular alignment of a hydrofoil coupled to a mounting block having a flat bottom surface where the mounting block is pivotally mounted to a cylindrical strut.

BACKGROUND OF THE INVENTION

Hydrofoils are used on a wide variety of undersea vehicles. The pitch on a hydrofoil can be fixed, adjustably fixed or continuously adjustable depending on the particular application. For example, the U.S. Navy utilizes minesweeping equipment having hydrofoils that are pivotally coupled to a strut by a locking bolt. That is, prior to use, the locking bolt is loosened, the angle on the hydrofoil is adjusted, and the locking bolt is re-tightened. Setting a particular hydrofoil angle is difficult as the weight of the hydrofoil must be supported at the specified angle while the locking bolt is loose and while the locking bolt is being tightened.

SUMMARY OF THE INVENTION

Accordingly, it is an object of the present invention to provide a tool that facilitates the angular adjustment of a hydrofoil.

Another object of the present invention is to provide a tool that can support a hydrofoil assembly at a specified angle during the angular adjustment of the hydrofoil assembly.

Still another object of the present invention is to provide a hydrofoil angular adjustment tool that is easy to use.

Other objects and advantages of the present invention will become more obvious hereinafter in the specification and drawings.

In accordance with the present invention, a tool facilitates the angular alignment of a hydrofoil coupled to a mounting block having a flat bottom surface area where the mounting block is pivotally coupled to a cylindrical strut having a longitudinal axis. The tool comprises a saddle for straddling the cylindrical strut and defining a plane offset therefrom. The plane is parallel to the cylindrical strut's longitudinal axis and is aligned with the flat bottom surface area of the mounting block. A plate coupled to the saddle lies in the plane defined by the saddle. The plate has an alignment edge that, when positioned by the saddle adjacent the flat bottom surface area, forms a desired angle with respect to the longitudinal axis of the cylindrical strut.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
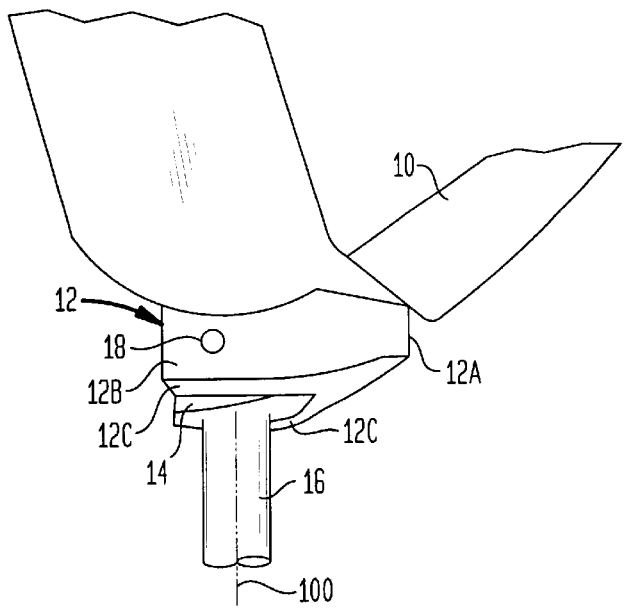
FIG. 1 is a perspective view of a hydrofoil assembly mounted on a cylindrical strut.

Referring now to the drawings, and more particularly to FIG. 1, a hydrofoil assembly and mounting used on one example of a type of minesweeping equipment are illustrated. More specifically, a hydrofoil 10 is coupled to a rigid mounting block 12 which is faired at its nose end 12A to facilitate the flow of water therearound. Mounting block 12 extends aft of nose end 12A to define two spaced-apart flanges 12B, the underside of which includes flat surface areas 12C on either side of block 12. Mounting block 12 with hydrofoil 10 coupled thereto is mounted to a top block 14 of a cylindrical strut 16. Such mounting is accomplished by means of a locking bolt 18 that passes all the way through each of flanges 12B and top block 14 sandwiched by flanges 12B. When locking bolt 18 is loosened, mounting block 12 along with hydrofoil 10 can pivot about locking bolt 18 thereby allowing the pitch angle of hydrofoil 10 to be changed. Once a desired angle is achieved, locking bolt 18 is tightened to fix mounting block 12 to top block 14.

Figure 3:
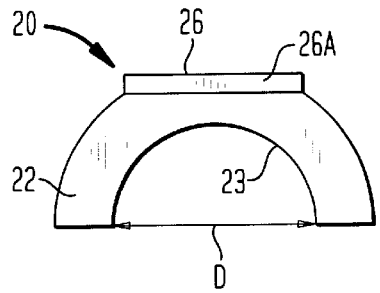
FIG. 3 is an end view of the tool taken along line 3—3 of FIG. 1.
Figure 2:
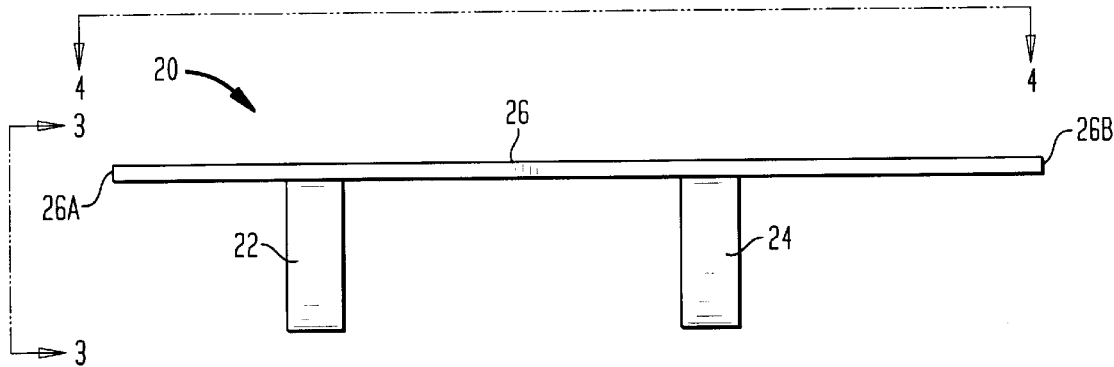
FIG. 2 is a side view of a tool for facilitating angular alignment of the hydrofoil assembly in FIG. 1 according to an embodiment of the present invention.
Figure 4:
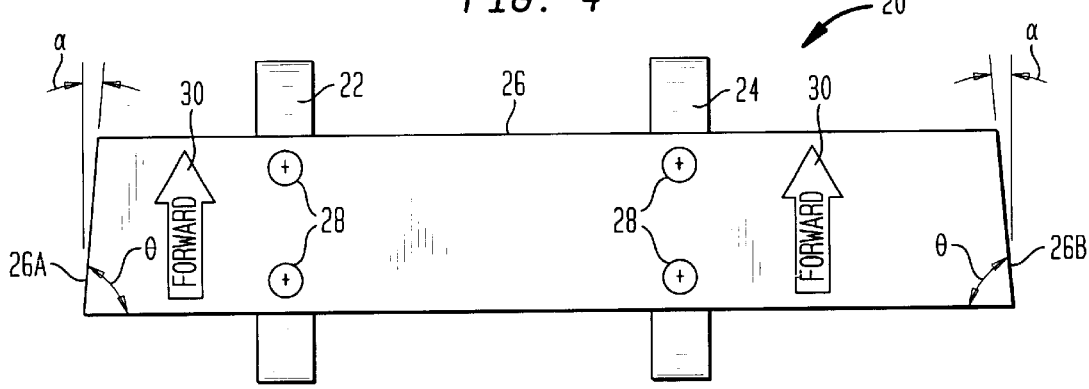
FIG. 4 is a plan view of the tool taken along line 4—4 of FIG. 1.

To facilitate the above described angle adjustment process, a tool in accordance with the present invention can be used. Referring now simultaneously to FIGS. 2–4, one embodiment of the present invention's hydrofoil angular adjustment tool is shown and referenced generally by numeral 20. Tool 20 has a saddle portion which, in the illustrated embodiment, consists of first and second spaced-apart saddles 22 and 24. A plate 26 is fixedly coupled to saddles 22 and 24 by means of, for example, screws 28. It is to be understood that more or fewer saddles could be used without departing from the scope of the present invention. In general, the saddle portion of tool 20 should engage cylindrical strut 16 while properly positioning plate 26 relative to one of flat surface areas 12C of mounting block 12. One way of achieving engagement with cylindrical strut 16 is for each of saddles 22 and 24 to define hemispherical cutouts (such as cutout 23 illustrated for saddle 22 in FIG. 3) that allow the saddles to straddle cylindrical strut 16. Note that a similar cutout would be formed in saddle 24. For secure engagement of cylindrical strut 16, the diameter D of each cutout should be equal to the outside diameter of cylindrical strut 16.

Proper positioning of plate 26 relative to mounting block 12 requires that plate 26 be aligned underneath one of flat surface areas 12C for reasons that will be explained further below. To do this, saddles 22 and 24 are sized to position plate 26 in a plane that is offset from cylindrical strut 16 but parallel to the longitudinal axis 100 of strut 16.

In general, plate 16 includes at least one (alignment) edge that is shaped/angled such that when saddles 22 and 24 are engaging cylindrical strut 16, the alignment edge can abut one of flat surface areas 12C. Then, with locking bolt 18 loosened, mounting block 12 can be pivoted until flat surface area 12C rests on the alignment edge. Since saddles 22 and 24 position plate 26 along longitudinal axis 100 of cylindrical strut 16, the angle that the alignment edge of plate 26 makes with longitudinal axis 100 of cylindrical strut 16 is used to set the angle of mounting block 12, and, therefore, set the angle of hydrofoil 10. It is to be understood that the particular angle provided by the alignment edge is not a limitation of the present invention.

In the illustrated embodiment, plate 26 is a trapezoidal-shaped plate as best seen in FIG. 4. Alignment edges 26A and 26B are defined by the trapezoid's angular sides, each of which forms an identical acute angle θ which, in turn, defines an alignment angle a for mounting block 12 and hydrofoil 10. When the plate's parallel edges 26C and 26D are positioned by saddles 22 and 24 to be parallel to longitudinal axis 100, the alignment edge will form an angle θ with longitudinal axis 100 of cylindrical strut 16.

With tool 20 constructed as shown and described, it may be used from either side of cylindrical strut 16 to cooperate with either of flat surface areas 12C. To insure that the correct angle is being set, indicia 30 can be included on the face of plate 26 (or other visible portions of tool 20) indicating which way tool 20 should face relative to, for example, the forward part of mounting block 12 and hydrofoil 10.

In use of the present invention, alignment tool 20 is positively positioned on the hydrofoil assembly's cylindrical strut 16 and is held in place beneath and abutting mounting block 12 as the hydrofoil assembly's locking bolt 18 is loosened. Mounting block 12 is then pivoted until its flat surface area 12C rests on one of the alignment edges 26A or 26B of plate 26. Locking bolt 18 is then tightened and tool 20 is taken away.

The advantages of the present invention are numerous. The alignment tool can be positioned and held in place to set the proper angle of the loosened hydrofoil assembly while supporting the weight of the hydrofoil assembly as the locking bolt is tightened. The tool is simple and inexpensive and can be used from either side of the hydrofoil assembly. The use of hemispherical saddle(s) allows the tool to be centered on the cylindrical strut without requiring the alignment of centerline markings when positioning the tool.

Although the invention has been described relative to a specific embodiment thereof, there are numerous variations and modifications that will be readily apparent to those skilled in the art in light of the above teachings. For example, as mentioned above, the function of saddles 22 and 24 can be accomplished with a one-piece saddle or additional saddles. Tool 20 could be made from a variety of metals or non-corrosive plastics or other composites. The tool can have a single alignment edge or two opposing alignment edges at either end of the tool's plate as described above. In the case of two alignment edges, the alignment angles defined thereby can be identical as in the case of a trapezoidal plate. However, the alignment angles defined by opposing alignment edges could also be different without departing from the scope of the present invention. It is therefore to be understood that, within the scope of the appended claims, the invention may be practiced other than as specifically described.

What is claimed as new and desired to be secured by Letters Patent of the United States is:

1. A tool for facilitating angular alignment of a hydrofoil coupled to a mounting block having a flat bottom surface area wherein said mounting block is pivotally coupled to a cylindrical strut having a longitudinal axis, said tool comprising:
   a saddle for engaging said cylindrical strut; and
   a plate coupled to said saddle, said plate having an alignment edge that, when positioned by said saddle beneath said flat bottom surface area, forms a desired angle with respect to said longitudinal axis.

2. A tool as in claim 1 wherein said saddle comprises at least one hemispherical section for engaging said cylindrical strut.

3. A tool as in claim 2 wherein said at least one hemispherical section has an inside diameter equal to an outside diameter of said cylindrical strut.

4. A tool as in claim 1 wherein said saddle comprises two hemispherical sections spaced apart from one another for engaging said cylindrical strut.

5. A tool as in claim 4 wherein each of said two hemispherical sections has an inside diameter equal to an outside diameter of said cylindrical strut.

6. A tool as in claim 1 further comprising indicia placed on a visible portion of said plate for indicating proper positioning of said tool relative to fore and aft portions of said hydrofoil.

7. A tool as in claim 1 wherein said plate further comprises a second alignment edge opposite said alignment edge which, when positioned by said saddle on said cylindrical strut, forms another desired angle with respect to said longitudinal axis.

8. A tool as in claim 7 wherein said plate is a trapezoidal plate.

9. A tool for facilitating angular alignment of a hydrofoil coupled to a mounting block having a flat bottom surface area wherein said mounting block is pivotally coupled to a cylindrical strut having a longitudinal axis, said tool comprising:
   a saddle for straddling said cylindrical strut and defining a plane offset from said cylindrical strut, said plane being parallel to said longitudinal axis and aligned with said flat bottom surface area; and
   a plate coupled to said saddle straddling said cylindrical strut and lying in said plane, said plate having an alignment edge that, when positioned by said saddle adjacent said flat bottom surface area, forms a desired angle with respect to said longitudinal axis.

10. A tool as in claim 9 wherein said saddle comprises at least one hemispherical section for engaging said cylindrical strut.

11. A tool as in claim 10 wherein said at least one hemispherical section has an inside diameter equal to an outside diameter of said cylindrical strut.

12. A tool as in claim 9 wherein said saddle comprises two hemispherical sections spaced apart from one another for engaging said cylindrical strut.

13. A tool as in claim 12 wherein each of said two hemispherical sections has an inside diameter equal to an outside diameter of said cylindrical strut.

14. A tool as in claim 9 further comprising indicia placed on a visible portion of said plate for indicating proper positioning of said tool relative to fore and aft portions of said hydrofoil.

15. A tool as in claim 9 wherein said plate further comrpises a second alignment edge opposite said alignment edge which, when positioned by said saddle on said cylindrical strut, forms another desired angle with respect to said longitudinal axis.

16. A tool as in claim 15 wherein said plate is a trapezoidal plate.

17. A tool for facilitating angular alignment of a hydrofoil coupled to a mounting block having a flat bottom surface area wherein said mounting block is pivotally coupled to a cylindrical strut having a longitudinal axis, said tool comprising:
   a saddle for straddling said cylindrical strut and defining a plane offset from said cylindrical strut, said plane being parallel to said longitudinal axis and aligned with said flat bottom surface area; and a trapezoidal-shaped plate having opposing angular sides, said plate being coupled to said saddle straddling said cylindrical strut and lying in said plane with said opposing angular sides spaced apart along said longitudinal axis to form identical angles therewith.

18. A tool as in claim 17 wherein said saddle comprises at least one hemispherical section for engaging said cylindrical strut.

19. A tool as in claim 18 wherein said at least one hemispherical section has an inside diameter equal to an outside diameter of said cylindrical strut.

20. A tool as in claim 17 wherein said saddle comprises two hemispherical sections spaced apart from one another for engaging said cylindrical strut.

21. A tool as in claim 20 wherein each of said two hemispherical sections has an inside diameter equal to an outside diameter of said cylindrical strut.

22. A tool as in claim 17 further comprising indicia placed on a visible portion of said plate for indicating proper positioning of said tool relative to fore and aft portions of said hydrofoil.

* * * * *